US012600033B1

(12) United States Patent
Khodaei Mehr et al.

(10) Patent No.: US 12,600,033 B1
(45) Date of Patent: Apr. 14, 2026

(54) DYNAMIC SYSTEM CONTROLLER WITH ONLINE MACHINE LEARNING

(71) Applicant: Sanctuary Cognitive Systems Corporation, Vancouver (CA)

(72) Inventors: Javad Khodaei Mehr, Burnaby (CA); Rodrigo Barbosa, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

(21) Appl. No.: 19/310,237

(22) Filed: Aug. 26, 2025

Related U.S. Application Data

(60) Provisional application No. 63/820,756, filed on Jun. 10, 2025.

(51) Int. Cl.
B25J 9/16 (2006.01)
B25J 9/14 (2006.01)
B25J 15/10 (2006.01)

(52) U.S. Cl.
CPC ................. B25J 9/163 (2013.01); B25J 9/14 (2013.01); B25J 9/1633 (2013.01); B25J 9/1689 (2013.01); B25J 15/10 (2013.01)

(58) Field of Classification Search
CPC ... B25J 9/163; B25J 9/14; B25J 9/1633; B25J 9/1689; B25J 15/10
See application file for complete search history.

(56) References Cited

FOREIGN PATENT DOCUMENTS

CN 108436913 B * 12/2020 ............ B25J 9/1682

OTHER PUBLICATIONS

CN-108436913-B English Translation (Year: 2020).*

* cited by examiner

*Primary Examiner* — Basil T. Jos
(74) *Attorney, Agent, or Firm* — Adenike Adebiyi; Thomas Mahon

(57) ABSTRACT

A dynamic system controller includes a first error detection unit that determines a first error between a joint state and a joint state target. The joint state describes an actual state of a set of joints in a dynamic body. The set of joints has one or more degrees of freedom that are controlled by a set of actuators. An impedance controller generates an impedance torque or force based on the first error. A first neural network accepts the joint state target and outputs an estimated actuation force. A second error detection unit determines a second error between an actual actuation force applied to the set of joints by the set of actuators at the joint state and a combination of the impedance torque or force and the estimated actuation force. A force controller generates a set of actuation commands based on the second error.

20 Claims, 6 Drawing Sheets

DYNAMIC SYSTEM CONTROLLER WITH ONLINE MACHINE LEARNING

CROSS-REFERENCE TO RELATED APPLICATIONS

This application claims the benefit of U.S. Provisional Application No. 63/820,756 filed Jun. 10, 2025, the content of which is incorporated herein by reference.

BACKGROUND

Robots are machines that can sense their environments and perform tasks autonomously or semi-autonomously or via teleoperation. A robot can have an end effector (or hand) for interaction with an environment. End effectors that can perform humanlike tasks can have fingers that can be moved individually. Such fingers can include actuated joints. When moving the joints, it is helpful to have feedback about the positions of the joints. Such feedback may be used to adjust a behavior of the end effector relative to the environment or to avoid collisions among the fingers.

SUMMARY

Described herein is a control system for a dynamic body (e.g., an end effector) including joints with degrees of freedom (DOFs) that are controlled by actuators.

In a first representative example, a dynamic system controller includes a first error detection point configured to determine a first error between a joint state and a joint state target. The joint state target describes an actual state of a set of joints in a dynamic body. The set of joints has one or more degrees of freedom that are controlled by a set of actuators. The dynamic system controller includes an impedance controller configured for impedance control. The impedance controller receives the first error and generates an impedance torque or force based on the first error. The dynamic system controller includes a first neural network that accepts the joint state target as input and outputs an estimated actuation force to move the set of joints to the joint state target. The dynamic system controller includes a second error detection point configured to determine a second error between an actual actuation force applied to the set of joints by the set of actuators at the joint state and a reference force defined by a combination of the impedance torque or force and the estimated actuation force. The dynamic system controller includes a force controller configured for force control. The force controller receives the second error and generates a set of actuation commands based on the second error.

In a second representative example, a method of dynamic system control includes determining a first error between a joint state and a joint state target. The joint state describes an actual state of a set of joints in a dynamic body. The set of joints has one or more degrees of freedom that are controlled by a set of actuators. The method includes applying the first error to an input of an impedance controller configured for impedance control to obtain an impedance torque or force based on the first error. The method includes applying the joint state target to an input of a first neural network to obtain an estimated actuation force to move the set of joints to the joint state target. The method includes determining an actual actuation force applied to the set of joints by the set of actuators at the joint state. The method includes determining a second error between the actual actuation force and a combination of the impedance torque or force and the estimated actuation force. The method includes applying the second error to an input of a force controller configured for force control to obtain a set of actuation commands.

In a third representative example, a method of dynamic system control includes operating a dynamic system controller in a first mode. The operation includes at least one cycle of accepting a first joint state describing an actual state of a set of joints in a dynamic body, the set of joints having one or more degrees of freedom that are controlled by a set of actuators; accepting a first joint state target; determining a first error between the joint state and the joint state target; applying the first error to an input of an impedance controller configured for impedance control to obtain a first impedance torque or force based on the first error; determining a second error between the first impedance torque or force and an actual actuation force applied to the set of joints at the first joint state; and applying the second error to an input of a force controller configured for force control to obtain a first set of actuation commands. During operation of the dynamic system controller in the first mode, a first neural network is trained to learn a mapping between the first joint state and the actual actuation force applied to the set of joints at the first joint state.

In a fourth representative example, a method of controlling an end effector includes determining a first error between a joint state of the end effector and a joint state target. The joint state describes an actual state of a set of joints in the end effector. The set of joints has one or more degrees of freedom that are controlled by a set of actuators. The method includes applying the first error to an input of an impedance controller configured for impedance control to generate an impedance torque or force based on the first error. The method includes determining a fingertip force for at least one finger of the end effector based on the joint state and the impedance torque. The method includes generating a control for the end effector based at least in part on the fingertip force.

In a fifth representative example, a dynamic system controller includes a first error detection point configured to determine and output a first error between a joint state and a joint state target. The joint state describes an actual state of a set of joints in a dynamic body, and the set of joints includes one or more degrees of freedom that are controlled by a set of actuators. The dynamic system controller includes an impedance controller having an impedance controller input and an impedance controller output. The impedance controller input is coupled to the first error detection point to receive the first error. The impedance controller is configured to generate and output an impedance torque or force based on the first error. The dynamic system controller includes a summing point having a first summing input coupled to the impedance controller output to receive the impedance torque or force. The summing point generates and outputs a reference force based at least in part on the impedance torque or force. The dynamic system controller includes a second error detection point configured to determine and output a second error between the reference force and an actual actuation force applied to the set of joints by the set of actuators at the joint state. The dynamic system controller includes a force controller having a force controller input coupled to the second error detection point to receive the second error. The force controller is configured to generate and output a set of actuation commands based on the second error.

In a sixth representative example, a method of dynamic system control includes determining a first error between a joint state and a joint state target. The joint state describes an actual state of a set of joints in a dynamic body, and the set of joints includes one or more degrees of freedom that are controlled by a set of actuators. The method includes applying the first error to an input of an impedance controller to output from the impedance controller an impedance torque or force based on the first error. The method includes generating a reference force based at least in part on the impedance torque or force. The method includes determining an actual actuation force applied to the set of joints by the set of actuators at the joint state. A second error between the reference force and the actual actuation force is determined and applied to an input of a force controller to output from the force controller a set of actuation commands.

DETAILED DESCRIPTION

General Considerations

Figure 1A:
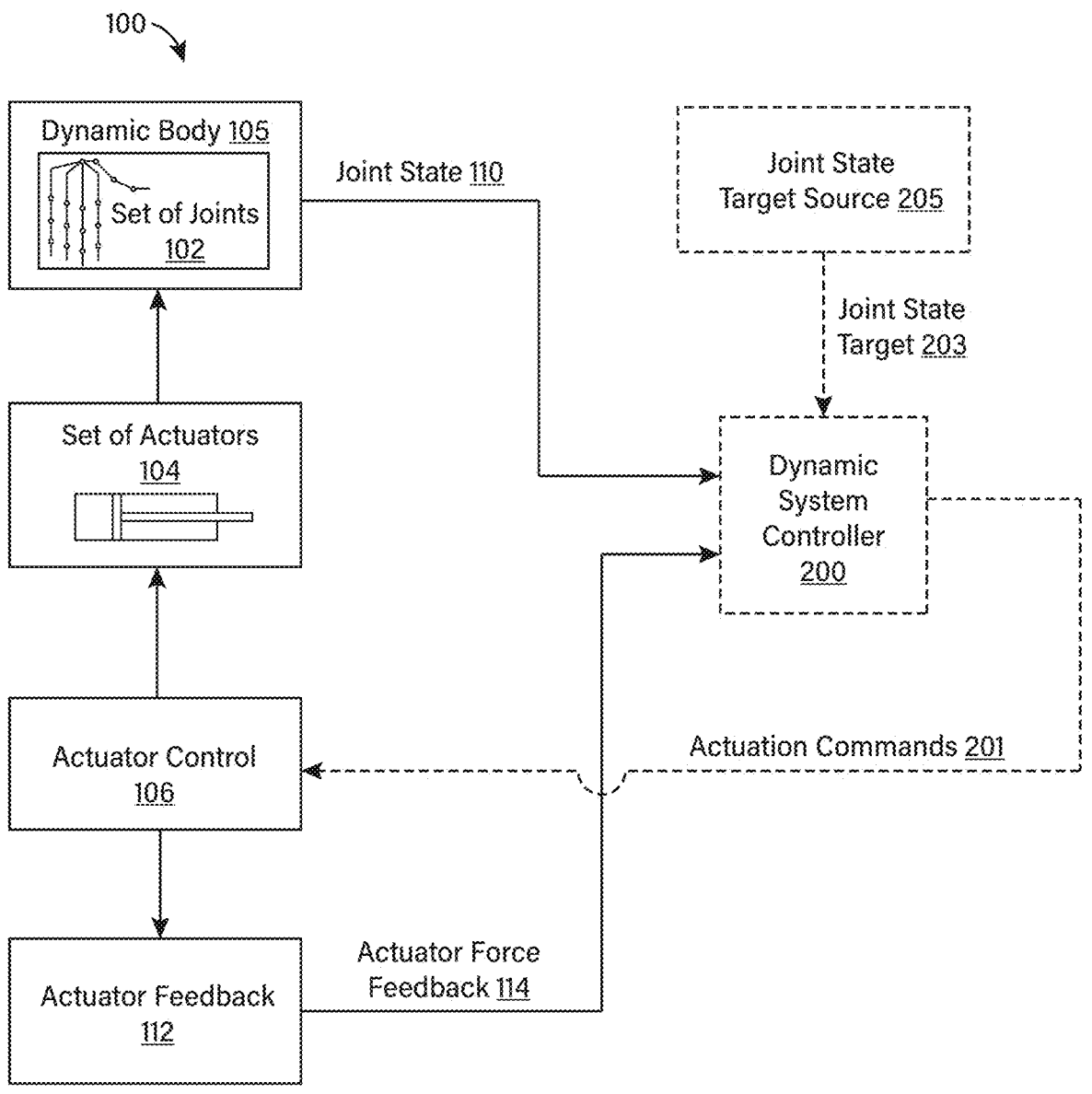
FIG. 1A is a diagram of an example dynamic system in communication with a dynamic system controller.

For the purpose of this description, certain specific details are set forth herein in order to provide a thorough understanding of disclosed technology. In some cases, as will be recognized by one skilled in the art, the disclosed technology may be practiced without one or more of these specific details, or may be practiced with other methods, structures, and materials not specifically disclosed herein. In some instances, well-known structures and/or processes associated with robots have been omitted to avoid obscuring novel and non-obvious aspects of the disclosed technology.

All the examples of the disclosed technology described herein and shown in the drawings may be combined without any restrictions to form any number of combinations, unless the context clearly dictates otherwise, such as if the proposed combination involves elements that are incompatible or mutually exclusive. The sequential order of the acts in any process described herein may be rearranged, unless the context clearly dictates otherwise, such as if one act or operation requests the result of another act or operation as input.

In the interest of conciseness, and for the sake of continuity in the description, same or similar reference characters may be used for same or similar elements in different figures, and description of an element in one figure will be deemed to carry over when the element appears in other figures with the same or similar reference character, unless stated otherwise. In some cases, the term "corresponding to" may be used to describe correspondence between elements of different figures. In an example usage, when an element in a first figure is described as corresponding to another element in a second figure, the element in the first figure is deemed to have the characteristics of the other element in the second figure, and vice versa, unless stated otherwise.

The word "comprise" and derivatives thereof, such as "comprises" and "comprising", are to be construed in an open, inclusive sense, that is, as "including, but not limited to". The singular forms "a", "an", "at least one", and "the" include plural referents, unless the context dictates otherwise. The term "and/or", when used between the last two elements of a list of elements, means any one or more of the listed elements. The term "or" is generally employed in its broadest sense, that is, as meaning "and/or", unless the context clearly dictates otherwise. When used to describe a range of dimensions, the phrase "between X and Y" represents a range that includes X and Y. As used herein, an "apparatus" may refer to any individual device, collection of devices, part of a device, or collections of parts of devices.

The term "coupled" without a qualifier generally means physically coupled or linked and does not exclude the presence of intermediate elements between the coupled elements absent specific contrary language. The term "plurality" or "plural" when used together with an element means two or more of the element. Directions and other relative references (e.g., inner and outer, upper and lower, above and below, and left and right) may be used to facilitate discussion of the drawings and principles but are not intended to be limiting.

The headings and Abstract are provided for convenience only and are not intended, and should not be construed, to interpret the scope or meaning of the disclosed technology.

Example I—Overview

Described herein is a controller for a dynamic body including actuated joints. The controller can determine actuation commands to move the joints from a current state to a target state. The controller includes a neural network that predicts an actuation force to apply to the joints at a given state. The neural network can learn the system dynamics within the controller.

In some examples, the control system can generate contact force information for the dynamic body. For example, if the dynamic body is an end effector having one or more fingers with joints, the controller can generate fingertip force information for the end effector that does not rely on tactile sensor data.

The fingertip force information outputted by the controller may be consumed by other systems. In one example, a machine learning system that is training a policy for the end effector to perform a task may use the fingertip force information to determine when the end effector is grasping an object. In another example, the machine learning system may use the fingertip force information to detect collisions between different joints and to improve the policy to avoid the collisions, thereby extending the lifespan of the hardware. In yet another example, a teleoperation system piloting the end effector to perform a task may use the contact force information to provide force feedback to the teleoperation pilot.

Example II—Dynamic System

FIG. 1A illustrates a dynamic system 100 including a set of joints 102 having one or more degrees of freedom (DOFs) and a set of actuators 104 that control the DOFs. The set of joints 102 may have one or more joints, and the set of actuators 104 may have one or more actuators. The set of joints 102 are in a dynamic body 105 having links that are connected together by the set of joints 102 such that actuation of the DOFs of the set of joints 102 can cause movement of the dynamic body 105 along a desired trajectory. An actuator control 106 translates a set of actuator commands (e.g., actuation commands 201) to controls for the set of actuators 104.

Each joint in the set of joints 102 can have a state defined by a set of parameters (e.g., position of the joint, velocity of the joint, and/or effort applied to the joint). A joint may have one or more DOFs, and each DOF can have a value for each parameter in the set of parameters. A joint state for the set of joints 102 can be an array of state values, with each state value representing an actual state of a joint or DOF in the set of joints 102. Each state value can have a value for each of the parameter in the set of parameters defining the state. In some examples, the joint state may be in the form of encoder readings from encoders arranged to measure the joint state parameters. The dynamic body 105 (or a controller associated with the dynamic body 105) can output a joint state 110 for the set of joints 102.

An actuator feedback 112 can receive sensor data generated by sensors in the actuator control 106 or sensors attached to the set of actuators 104 and output an actuation force feedback 114, which may be used to compute an actual actuation force applied by the set of actuators 104 to the set of joints 102. The type of sensor data received by the actuator feedback 112 can depend on the type of actuators in the set of actuators 104. For example, for a hydraulic actuator, the sensor data may include valve pressures that control fluid communication with fluid chambers of the actuators. For an electric actuator, the sensor data may include electric field (e.g., current or voltage) applied to a motor of the actuator or torque outputted by the motor.

A dynamic body controller 200 can receive the joint state 110 from the dynamic body 105, the actuator force feedback 114 from the actuator feedback 112, and a joint state target 203 from a joint state target source 205 (e.g., a trajectory controller of a motion planning system) as inputs and determine a set of actuator commands 201 based on these inputs. The joint state target 203 includes setpoints for the parameters that define the state of each joint or DOF in the set of joints 102. The set of actuator commands 201 can be commands to move the joint state 110 to the joint state target 203. The dynamic body controller 200 is described in more detail in Example IV.

Example III—Dynamic System with Fluid-Powered Actuation

Figure 1B:
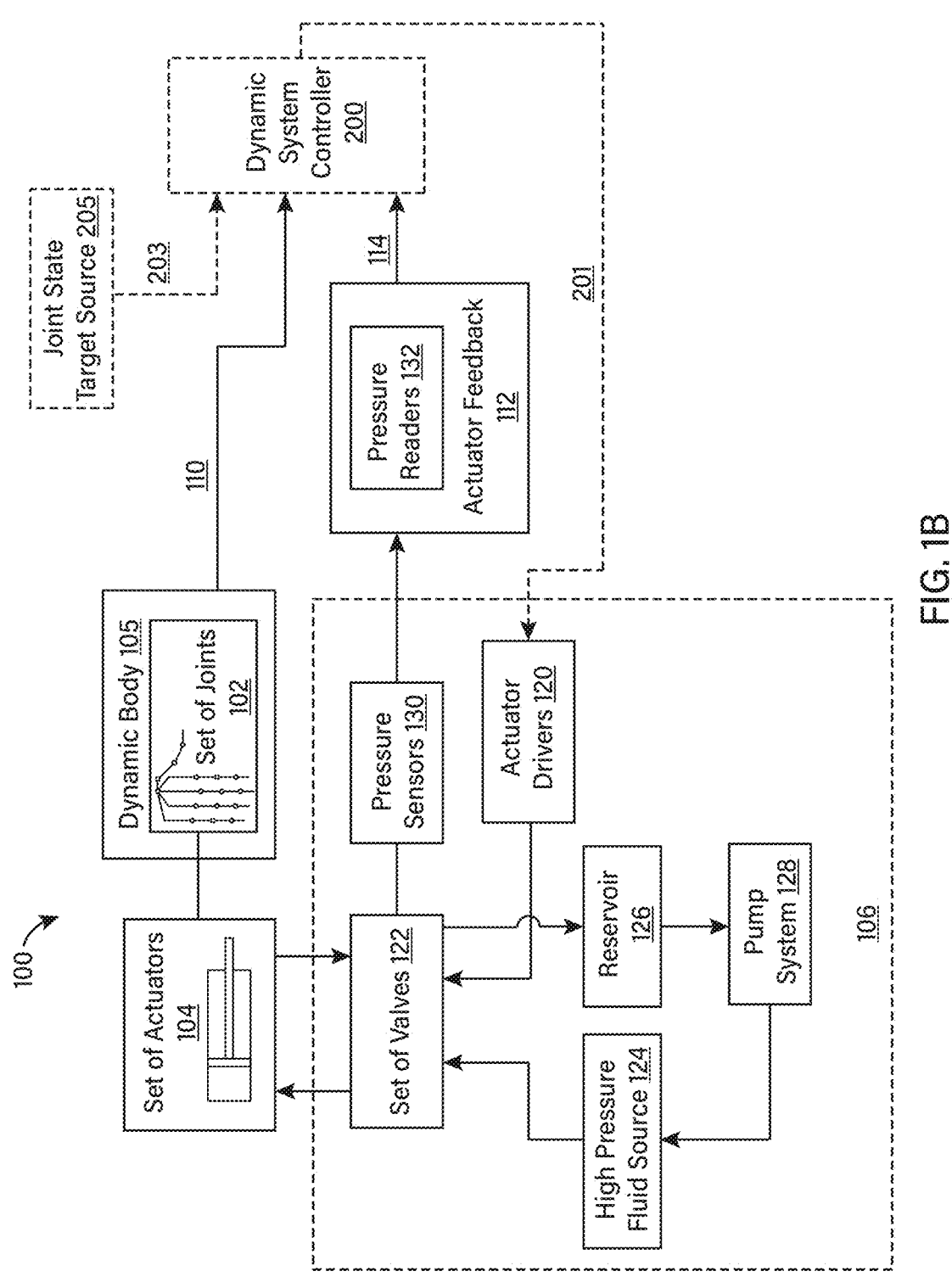
FIG. 1B is a diagram illustrating a detailed implementation of the example dynamic system shown in FIG. 1A.

FIG. 1B illustrates a more detailed implementation of the dynamic system 100. In FIG. 1B, the set of actuators 104 includes one or more fluid-powered actuators. In a particular example, the set of actuators 104 includes one or more hydraulic cylinder actuators, which may be single-acting or double-acting cylinder actuators. Both single-acting and double-acting cylinder actuators include a piston within a cylinder. The single-acting cylinder includes one fluid chamber formed on one side of the piston. The double-acting cylinder includes two fluid chambers formed on opposite sides of the piston.

The actuator control 106 can include a set of valves 122 arranged to control fluid flow from and to fluid chambers of the actuators. The set of valves 122 may include pressure valves that control flow of fluid from a high-pressure fluid source 124 (e.g., an accumulator) to the fluid chambers of the actuators 104. The set of valves 122 may include exhaust valves that control flow of fluid from the fluid chambers of the actuators 104 to a reservoir 126. A pump system 128 may pump fluid from the reservoir 126 to the high-pressure fluid source 124.

In some examples, opening and closing of the valves 122 may be controllable by an applied electrical field (e.g., an applied voltage or electrical current). For example, the valves 122 can be electrohydraulic valves such as described in U.S. patent application Ser. No. 18/825,697 (Farzad Forughi et al., "Miniaturized Hydraulic Valves, and Applications Thereof in Robot Systems").

The valves 122 can have associated pressure sensors 130 to measure valve pressures (e.g., pressures in the cavities of the valves 122). The actuator feedback 112 can include pressure readers 132 that read the outputs of the pressure sensors 130. The actuator feedback 112 can provide the sensor readings as the actuator force feedback 114. The actuator control 106 may include actuator drivers 120 that translate the set of actuation commands 201 to valve commands (e.g., valve voltages) for the valves 122.

Example IV—Dynamic System Controller

Figure 2A:
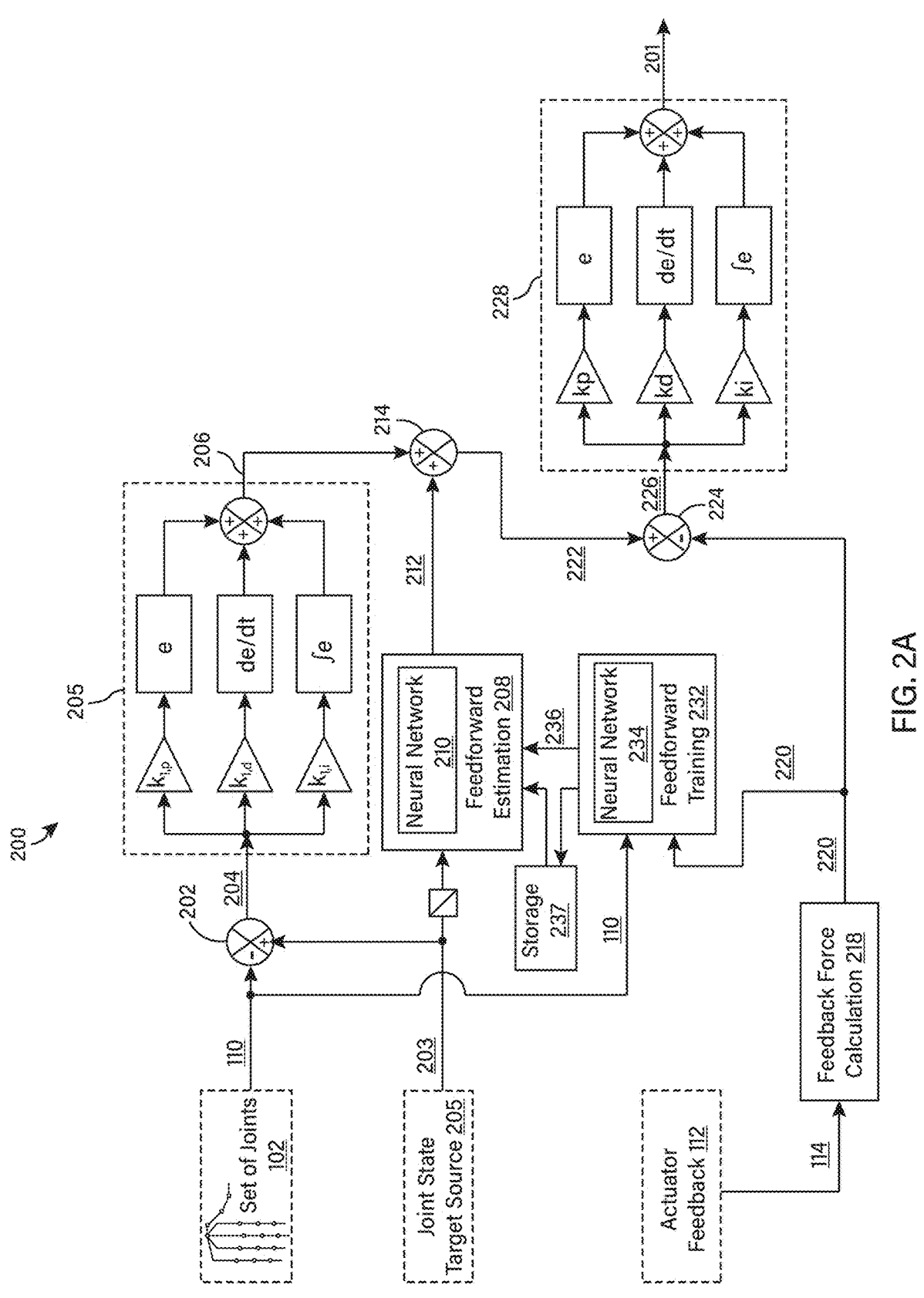
FIG. 2A is a diagram of an example implementation of the dynamic system controller shown in FIGS. 1A and 1B.

FIG. 2A illustrates an exemplary implementation of the dynamic system controller 200 shown in FIGS. 1A and 1B. The dynamic system controller 200 accepts as inputs a joint state 110 for a set of joints 102 in a dynamic body (105 in FIGS. 1A and 1B), a joint state target 203, and an actuation force feedback 114 for a set of actuators (104 in FIGS. 1A and 1B). The joint state target 203 contains target values (or setpoints) for parameters of states of joints in the joint state 110. For example, the joint state target 203 may contain position values for states of joints in the joint state 110, or the joint state target 203 may contain position and velocity values for states of joints in the joint state 110.

The dynamic system controller 200 includes a feedback force calculation 218 that can accept the actuation force feedback 114 as an input and compute an actual actuation force 220 based on the actuation force feedback 114. The actual actuation force 220 represents the actuation force applied by the set of actuators (104 in FIGS. 1A and 1B) to the set of joints 102 at the joint state 110. The actual actuation force 220 can be an array including an actual actuation force value for each joint or DOF in the set of joints 102.

In some examples, the set of actuators (104 in FIGS. 1A and 1B) may be fluid-powered actuators (e.g., hydraulic actuators) as described in Example III, and the actuator force feedback 114 may be pressure readings of valves that modulate the fluid pressures in the chambers of the actuators. The actuation force for a fluid-powered actuator can be calculated based on the fundamental relationship between force, pressure, and area. For a double-acting cylinder actuator, for example, the actuation force feedback 114 may include two pressure readings for the actuator. One pressure reading may correspond to the valve pressure of a valve fluidly connected to a fluid chamber at an extension side of the cylinder actuator, and the other pressure reading may correspond to the valve pressure of a valve fluidly connected to a fluid chamber at a retraction side of the cylinder actuator. The actuation force (extension or retraction force) of the actuator can be calculated based on the corresponding valve pressure and the effective area of the piston.

The dynamic system controller 200 includes a feedforward estimation 208 having a neural network 210 that can accept the joint state target 203 as an input and output an estimated actuation force 212. The estimated actuation force 212 corresponds to an estimate of the actuation force that the set of actuators (104 in FIGS. 1A and 1B) would apply to the set of joints 102 at the joint state target 203. The estimated actuation force 212 can be an array including an estimated actuation force value for each joint or DOF in the set of joints 102.

In some examples, the dynamic system controller 200 includes a feedforward training 232 having a neural network 234 that can learn a mapping between the joint state 110 and the actual actuation force 220. The feedforward training 232 can include applying the joint state 110 to the input layer of the neural network 234 and adjusting the weights of the neural network 234 to minimize an error between a predicted force at the output layer of the neural network 234 and the actual actuation force 220.

In some examples, the neural network 210 of the feedforward estimation 208 can have a similar network architecture to the neural network 234 of the feedforward training 232 so that the neural network 210 can use the weights of the neural network 234 to determine the estimated actuation force 212. In some examples, the neural networks 210, 234 may be shallow neural networks (e.g., having one or two hidden layers between the input and output layers).

The dynamic system controller 200 includes an error detection point 202 that accepts the joint state 110 and the joint state target 203 as inputs and outputs an error 204 (or difference) between the joint state 110 and the joint state target 203. The joint state target 203 includes setpoints for the parameters defining the state of each joint or DOF in the set of joints 102. The error detection point 202 determines the error 204 as the difference between the setpoints in the joint state target 203 and the corresponding parameter values in the joint state 110.

The dynamic system controller 200 includes an impedance controller 205 that models an interaction between the dynamic body (i.e., the body containing the set of joints 102) and the environment of the dynamic body as a spring-mass-damper system and assigns contact forces through the model. The impedance controller 205 accepts the error 204 from the error detection point 204 as an input and outputs an impedance torque/force 206 based on the error 204. If the actuators (104 in FIGS. 1A and 1B) are rotary actuators, the impedance torque/force 206 is impedance torque. If the actuators are linear actuators, the impedance torque/force 206 is impedance force. The impedance torque/force 206 can be an array including an impedance torque/force value for each joint (or DOF) in the set of joints 102.

In some examples, the impedance controller 205 uses a PID (proportional-integral-derivative) control (or is an impedance PID controller). The impedance controller 205 with PID can determine the impedance force/torque 206 according to the following expression:

$$\tau = k_{1,p}e + k_{1,d}\left(\frac{de}{dt}\right) + k_{1,i}\int e \tag{1}$$

The term t is the impedance torque/force 206. The term e is the error 204. The term $k_{1,p}$ is the proportional gain of the PID controller. The term $k_{1,d}$ is the derivative gain of the PID controller. The term $k_{1,i}$ is the integral gain of the PID controller. The controller gains $k_{1,p}$, $k_{1,d}$, and $k_{1,i}$ are constant values tuned for the spring-mass-damper system.

The dynamic system controller 200 includes a summing point 214 that receives the impedance force/torque 206 outputted by the impedance controller 205 and the estimated actuation force 212 outputted by the feedforward estimation 208 (or the neural network 210) as inputs and generates a reference force 222 as a combination (e.g., sum) of the impedance force/torque 206 and the estimated actuation force 212. If the feedforward estimation 208 is off (e.g., in a training mode of the dynamic system controller), then the reference force 222 can be determined based on the impedance force/torque 206 alone. The impedance component of the reference force 222 allows the reference force 222 to have spring-damper behavior around the joint state target 203. The reference force 222 may be an array including a reference force value for each joint or DOF in the set of joints 102.

The dynamic system controller 200 includes an error detection point 224 that receives the reference force 222 from the summing point 214 and the actual actuation force 220 from the feedback force calculation 218 and outputs an error 226 (or difference) between the reference force 222 and the actual actuation force 220.

The dynamic system controller 200 includes a force controller 228 that accepts the error 226 from the error detection point 224 and outputs a set of actuation commands 201, which can be received by the actuator control (106 in FIGS. 1A and 1B) and used to generate controls for the set of actuators (104 in FIGS. 1A and 1B). The set of actuation commands 201 depends on the type of actuators (104 in FIGS. 1A and 1B). If the actuators are fluid-powered actuators (e.g., hydraulic actuators), the set of actuation commands 201 can be a set of fluid flow rates, which can be used to generate a set of valve commands (e.g., valve voltages) for the set of valves (122 in FIG. 1B) that control fluid communication with the actuator fluid chambers. If the actuators are electric actuators, the set of actuation commands 201 may be a set of motor commands (e.g., motor currents).

In some examples, the force controller 228 uses PID control (or is a force PID controller). The force controller 228 with PID can determine the set of actuation commands 201 according to the following expression:

$$R = k_{2,p}e + k_{2,d}\left(\frac{de}{dt}\right) + k_{2,i}\int e \tag{2}$$

The term R corresponds to the set of actuation commands 201. The term e is the error 226. The term $k_{2,p}$ is the proportional gain of the controller. The term $k_{2,d}$ is the derivative gain of the controller. The term $k_{2,i}$ is the integral gain of the controller. The controller gains are constants that are determined by trial and error.

Referring to FIGS. 1A and 1B (see Examples II and III), the actuator control 106 of the dynamic system 100 can receive the set of actuation commands 201 from the force controller (228 in FIG. 2A) and generate controls for the set of actuators 104. The set of actuators 104 can respond to the controls, which can result in updates to the joint state 110 and the actuator force feedback 114. Referring to FIG. 2A, the dynamic system controller 200 can receive updates to the joint state 110, actuation force feedback 114, and joint state target 203 and output a new set of actuation commands 201 based on these updates.

The dynamic system controller 200 can operate in a training mode (see Example V) and in a normal mode (see Example VI). In the training mode, the feedforward training 232 is running, but the feedforward estimation 208 is not running. In the normal mode, the feedforward training 232 is not running, but the feedforward estimation 208 is running. In both modes, the dynamic system controller 200 can receive a joint state 110 and an actuation force feedback 114 from the dynamic system (100 in FIGS. 1A and 1B) and a joint state target 203 from the joint state target source 205 (e.g., a system generating any type of target trajectories for the dynamic system 100) and generate a set of actuator commands 201.

The dynamic system controller 200 can be implemented in a real-time computing system and can communicate with other systems (e.g., the dynamic system, a machine learning system, or a teleoperation system), for example, over EtherCAT.

Example V—Dynamic Systems Controller in Training Mode

Referring to FIG. 2A, in the training mode, a cycle of operation of the dynamic system controller 200 includes accepting the joint state 110 and the actuation force feedback 114 from a dynamic system (e.g., dynamic system 100 in FIGS. 1A and 1B) and the joint state target 203 from a joint state target source (e.g., joint state target source 205). The cycle of operation includes determining an error 204 between the joint state 110 and the joint state target 203 at the error detection point 202. The cycle of operation includes applying the error 204 to the input of the impedance controller 205 to obtain an impedance torque/force 206 based on the error 204. The cycle of operation includes feeding the impedance torque/force 206 to the summing point 214. In the training mode, the feedforward estimation 208 is off or is not running. As a result, the reference force 222 outputted from the summing point 214 is determined solely by the impedance torque/force 206.

The cycle of operation in the training mode includes applying the actuator force feedback 114 to the input of the feedback force calculation 218 to obtain an actual actuation force 220. The cycle of operation includes receiving the reference force 222 and the actual actuation force 220 at the error detection point 224 and outputting an error 226 (or difference) between the reference force 222 and the actual actuation force 220. The cycle of operation includes applying the error 226 to the input of the force controller 228 to obtain the set of actuation commands 201. The cycle of operation includes outputting the set of actuation commands 201 to the dynamic system.

The cycle of operation includes feeding the joint state 110 and the actual actuation force 220 to the feedforward training 232 so that the neural network 234 can learn a policy from the joint state 110 and the actual actuation force 220 (e.g., a policy to map joint state to actual actuation force). Training of the neural network 234 can include applying the joint state 110 to an input layer of the neural network 234 and adjusting the weights of the neural network 234 to minimize an error between an output of the neural network 234 and the actual actuation force 220 (this error can be referred to as "training estimation error").

The actuation control (106 in FIGS. 1A and 1B) of the dynamic system receives the set of actuator commands 201 outputted from the force controller 228 and generates controls for the set of actuators (104 in FIGS. 1A and 1B) based on the set of actuation commands 201. Operation of the set of actuators 104 with these controls can result in changes to the joint state 110 and the actuator force feedback 114. The dynamic body controller 200 can receive the updated joint state 110 and actuator feedback 114 and the joint state target 203 for the next cycle of operation.

The dynamic body controller 200 may complete one or more cycles of operation in the training mode. The stopping criteria for the training mode may be based on the feedforward training 232. For example, the feedforward training 232 may be allowed to run for a few minutes or until the training estimation error is at a desired value or below an error threshold. Once the stopping criteria is met, the feedforward training 232 can be turned off to allow the dynamic system controller 200 to enter the normal mode.

At the end of the training mode (or at the beginning of the normal mode), the weights of the neural network 234 are transferred to the neural network 210 of the feedforward estimation 208 (or, stated differently, the weights of the neural network 210 are initialized with the weights of the neural network 234). This allows the neural network 210 to use the trained weights of the neural network 234 to predict actuation force for a given joint state target. The weights of the neural network 234 may also be saved in a storage 237 so that the neural network 210 can be initialized with the stored weights (e.g., when the dynamic controller is started up).

In some examples, in the training mode, there is no external contact on the dynamic body (105 in FIGS. 1A and 1B) from the environment. In these examples, the neural network 234 learns a policy to estimate the actuation force applied at a particular joint state in the absence of external contact on the dynamic body. Since the neural network 210 of the feedforward estimation 208 uses the weights of the neural network 234, the neural network 210 inherits this policy.

Example VI—Dynamic Systems Controller in Normal Mode

Referring to FIG. 2A, in the normal mode, a cycle of operation of the dynamic system controller 200 includes accepting the joint state 110 and the actuation force feedback 114 from the dynamic system and the joint state target 203 from the joint state target source. The cycle of operation includes determining an error 204 between the joint state 110 and the joint state target 203 at the error detection point 202. The cycle of operation includes applying the error 204 to an input of the impedance controller 205 to obtain an impedance torque/force 206 based on the error 204. The cycle of operation includes feeding the impedance torque/force 206 to a summing point 214.

In the normal mode, the feedforward estimation 208 is running. In some examples, the neural network 210 of the feedforward estimation 208 has received the trained weights of the neural network 234 of the feedforward training 232 (see Example V) directly from the neural network 234 or from a storage (e.g., storage 237) in which the trained weights of the neural network 234 are stored, and the neural network 210 has been initialized with the trained weights. The joint state target 203 is applied to the input of the neural network 210 to obtain the estimated actuation force 212 for the joint state target 203. The impedance torque/force 206 and the estimated actuation force 212 are combined (e.g., summed) at the summing point 214 to obtain the reference force 222.

The cycle of operation includes applying the actuator force feedback 114 to the input of the feedback force calculation 218 to obtain an actual actuation force 220. The cycle of operation includes receiving the reference force 222 and the actual actuation force 220 at the error detection point 224 and outputting an error 226 (or difference) between the reference force 222 and the actual actuation force 220. The cycle of operation includes applying the error 226 to the input of the force controller 228 to obtain the set of actuation commands 201. The cycle of operation includes outputting the set of actuation commands 201 to the dynamic system.

The actuation control (106 in FIGS. 1A and 1B) of the dynamic system receives the set of actuator commands 201 outputted from the force controller 228 and generates controls for the set of actuators (104 in FIGS. 1A and 1B) based on the set of actuator commands 201. Operation of the set of actuators 104 with these controls can result in changes to the joint state 110 and the actuator force feedback 114. The dynamic body controller 200 can receive the updated joint 110 and actuator feedback 114 and the joint state target 203 for the next cycle of operation.

The dynamic body controller 200 may complete one or more cycles of operation in the normal mode. For each cycle of operation, the impedance controller 205 outputs the impedance torque/force 206 in a direction to minimize the error 204 between the joint state 110 and the joint state target 203. In some examples, the neural network 210 predicts the actuation force needed to move to the joint state target 203 when there is no external contact on the dynamic body. In these examples, if the neural network 210 is making good predictions, the error 204 between the joint state 110 and the joint state target 203 may be attributed primarily to external contact on the dynamic body from the environment, which means that the impedance torque/force 206 outputted by the impedance controller 205 will primarily determine the additional force needed to move to the joint state target 203 due to external contact on the dynamic body from the environment. This means that the impedance torque/force 206 contains contact force information. If there is no external contact on the dynamic body, the impedance torque/force 206 will be very close to zero.

Example VII—Contact Force Estimation

Figure 2B:
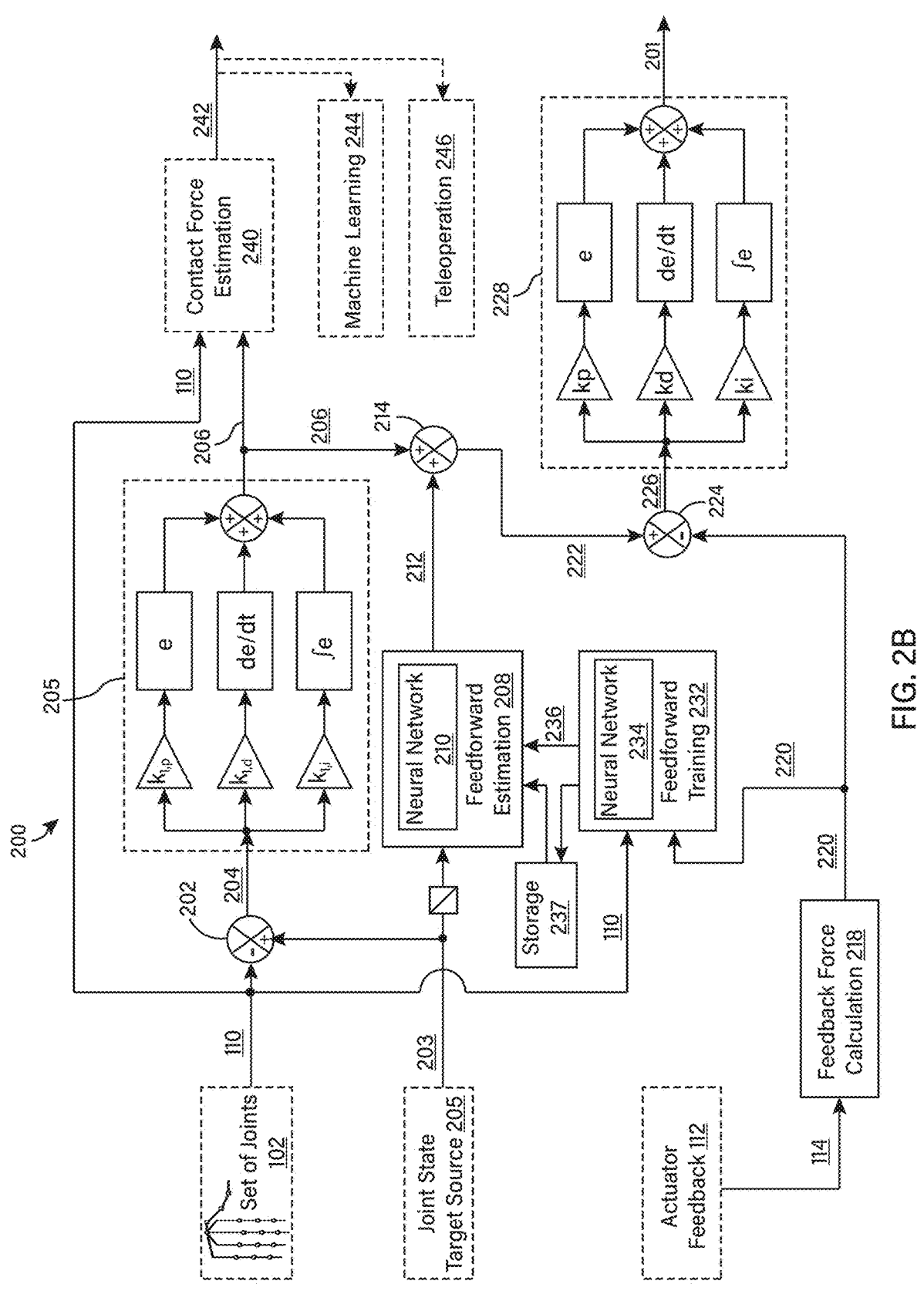
FIG. 2B illustrates the dynamic system controller of FIG. 2A with contact force estimation.

In some examples, as illustrated in FIG. 2B, the dynamic system controller 200 may output the joint state 110 and the impedance torque/force 206 to a contact force estimation 240. In the normal mode of the dynamic system controller 200, the impedance torque/force 206 contains information about external contact force on the dynamic body (see Example VI). The contact force estimation 240 can output an estimated contact force 242 on the dynamic body based on the contact force information in the impedance torque/force 206 and the joint state 110.

The impedance torque/force 206 can be an array of impedance torque/force values for each joint or DOF of the set of joints 102, with each impedance torque/force value representing an external contact force on the joint or DOF. If there is no external contact force on a joint or DOF, the impedance torque/force value for the joint or DOF will be very close to zero (e.g., if the impedance torque/force value can have a maximum value of 1 on a normalized scale, then very close to zero may be, for example, 0.1 or less).

In some examples, the dynamic body (105 in FIGS. 1A and 1B) can be an end effector having one or more fingers (see Example VIII). The set of joints 102 can be joints in the one or more fingers, and the contact force 242 outputted by the contact force estimation 240 can be fingertip force. In some examples, if the impedance torque/force 206 is impedance torque, the contact force estimation 240 can determine the fingertip force by obtaining a Jacobian of the joint state 110 and computing a fingertip force as follows:

$$F_{tip} = (J^T)^{-1} \tau \qquad (3)$$

The term $J^T$ is the transpose of the Jacobian, the term $\tau$ is impedance torque, and the term $F_{tip}$ is the fingertip force.

The fingertip force can include a fingertip force value for each finger in the end effector.

A different formulation based on virtual work may be used if the impedance torque/force 206 is impedance force. The principle of virtual work can be expressed as follows:

$$\delta W = \Sigma F_i \delta x^i = 0 \qquad (4)$$

The term $F_i$ are the external forces acting on the system and $\delta x_i$ are virtual displacements in the system. Based on Equation (4), virtual work on a finger can be expressed as:

$$\delta W = \Sigma F_{Ai} \delta x_{Ai} - F_{tip} \delta x_{tip} = 0 \qquad (5)$$

The term $F_A$ represents actuator force acting on the finger. The term $\delta x_A$ represents the actuator position or displacement. The term $F_{tip}$ represents fingertip force. The term $\delta x_{tip}$ represents fingertip displacement. Based on Equation (5), the fingertip force can be expressed as:

$$F_{tip} = \frac{\sum F_{Ai} \delta x_{Ai}}{\delta x_{tip}} \qquad (6)$$

The actuator force $F_A$ is obtained from the impedance force. The actuator position $\delta x_A$ can be determined from the joint state (e.g., the actuator position determines the joint position). The fingertip displacement $\delta x_{tip}$ can be obtained using forward kinematics and the joint angles in the joint state.

The fingertip force (or contact force) 242 outputted by the contact force estimation 240 may be used to generate or adjust a control for the end effector. In some examples, a machine learning system 244 or teleoperation system 246 may use the fingertip force to detect when the end effector is grasping an object. The machine learning system may use the fingertip force information to detect collisions between different joints of the end effector and to improve the policy to avoid the collisions, thereby extending the lifespan of the end effector hardware. In some examples, a teleoperation system may use the fingertip force to provide force feedback to a teleoperation pilot.

The contact force estimation 240 may be incorporated in the dynamic system controller 200 so that the dynamic system controller 200 outputs the fingertip force (or contact force). Alternatively, contact force estimation 240 may be incorporated in another system (e.g., a machine learning system or teleoperation system) that can receive the joint state 110 and impedance torque/force 206 from the dynamic system controller 200.

Example VIII—End Effector

Figure 3A:
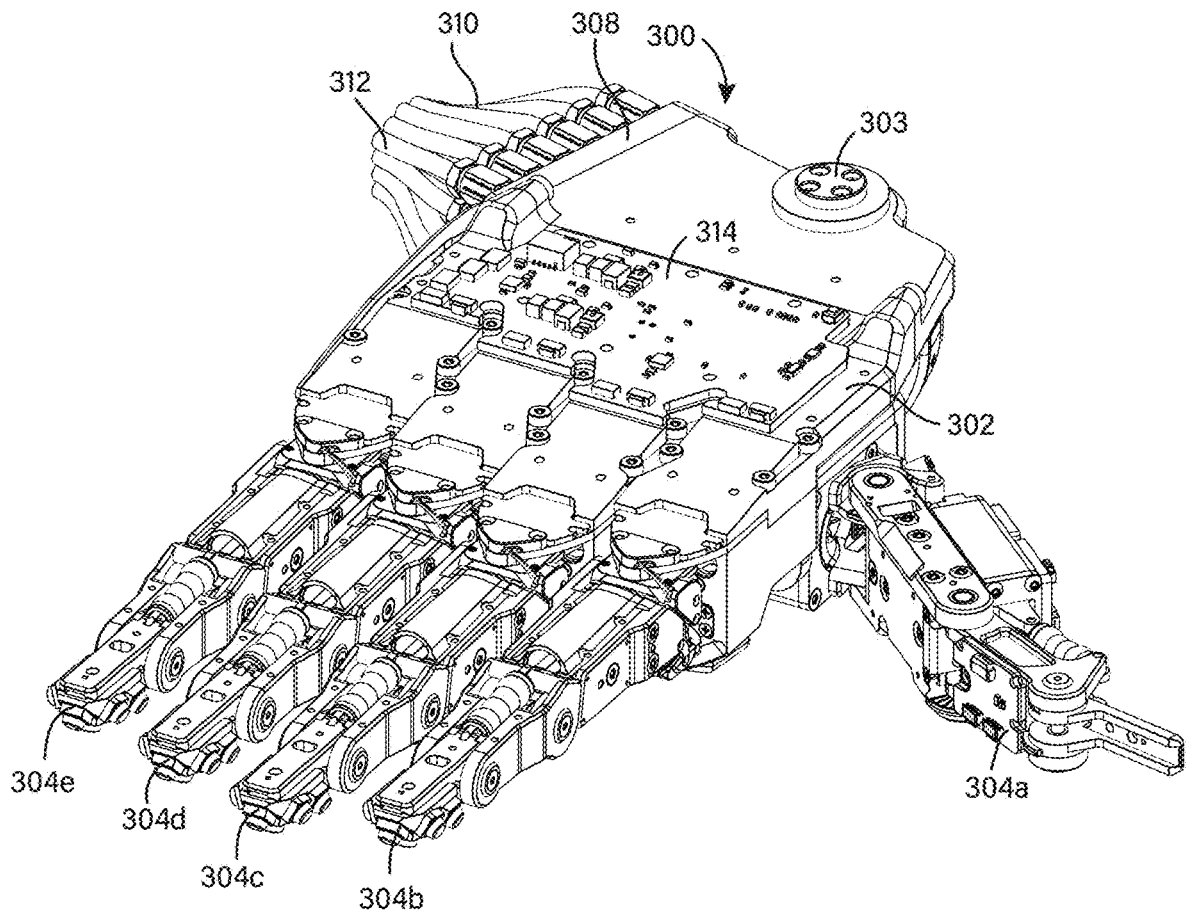
FIG. 3A is a projection view of an example end effector.

FIG. 3A illustrates an example end effector 300 that may be controlled by the dynamic system controller 200 (see Examples IV-VII). For example, the end effector 300 may be the dynamic body 105 of the dynamic system 100 shown in FIGS. 1A and 1B. However, it should be understood that the technology described herein is not limited to end effectors or to the particular end effector illustrated in FIG. 3A.

The end effector 300 has a shape and functionality similar to that of a humanoid hand. For example, the end effector 300 can grasp, grip, handle, touch, or release objects similar to how a human hand would. The end effector 300 includes a base 302, which can have a wrist interface 303 for attachment of a manipulator. The end effector 300 has articulable fingers 304*a-e* coupled to the base 302. Although the end effector 300 is illustrated with five fingers, the examples described herein are not limited to end effectors with five fingers (e.g., the end effector could have fewer or greater than five fingers).

In the illustrated example, the bases of the fingers 304*a-e* are coupled to the base 302 by joints. The fingers 304*a-e* have links and joints that can be articulated to emulate movements and poses of humanoid fingers. For example, the fingers 304*a-e* can be bent or extended to transform the end effector 300 between open configurations, grasping configurations, and closed configurations. In some examples, the actuators for the fingers 304*a-e* are mounted in the bases and links of the fingers. In other examples, the actuators may be in a manipulator to which the end effector 300 is appended, and a cable mechanism may be used to transmit actuation force from an actuator in the manipulator to the respective finger joint in the end effector.

In some examples, the actuators that control movement of the joints in the end effector can be hydraulic actuators. In the illustrated example, the hydraulic actuators are located in the fingers 304*a-e* and are connected to valves in a hydraulic metering unit (not shown) through hydraulic tubes 312 in a tube bundle 310 (the valves are connected to a hydraulic power unit through another set of connections). In the example, the tube bundle 310 is attached to a plate 308, which is mounted to a side of the base 302 (e.g., by a quick coupling). In other examples, the tube bundle 310 may be routed to the end effector 300 through a manipulator to which the end effector 300 is appended.

In some examples, a printed circuit board 314 may be mounted on the base 302 and include various circuitry for operation of the end effector 300. Additional circuit boards may be mounted on the fingers 304*a-e*. Encoders may be arranged at the joints of the fingers to measure parameters related to the states of the joints (e.g., position of the joints and/or velocity of the joints).

Figure 3B:
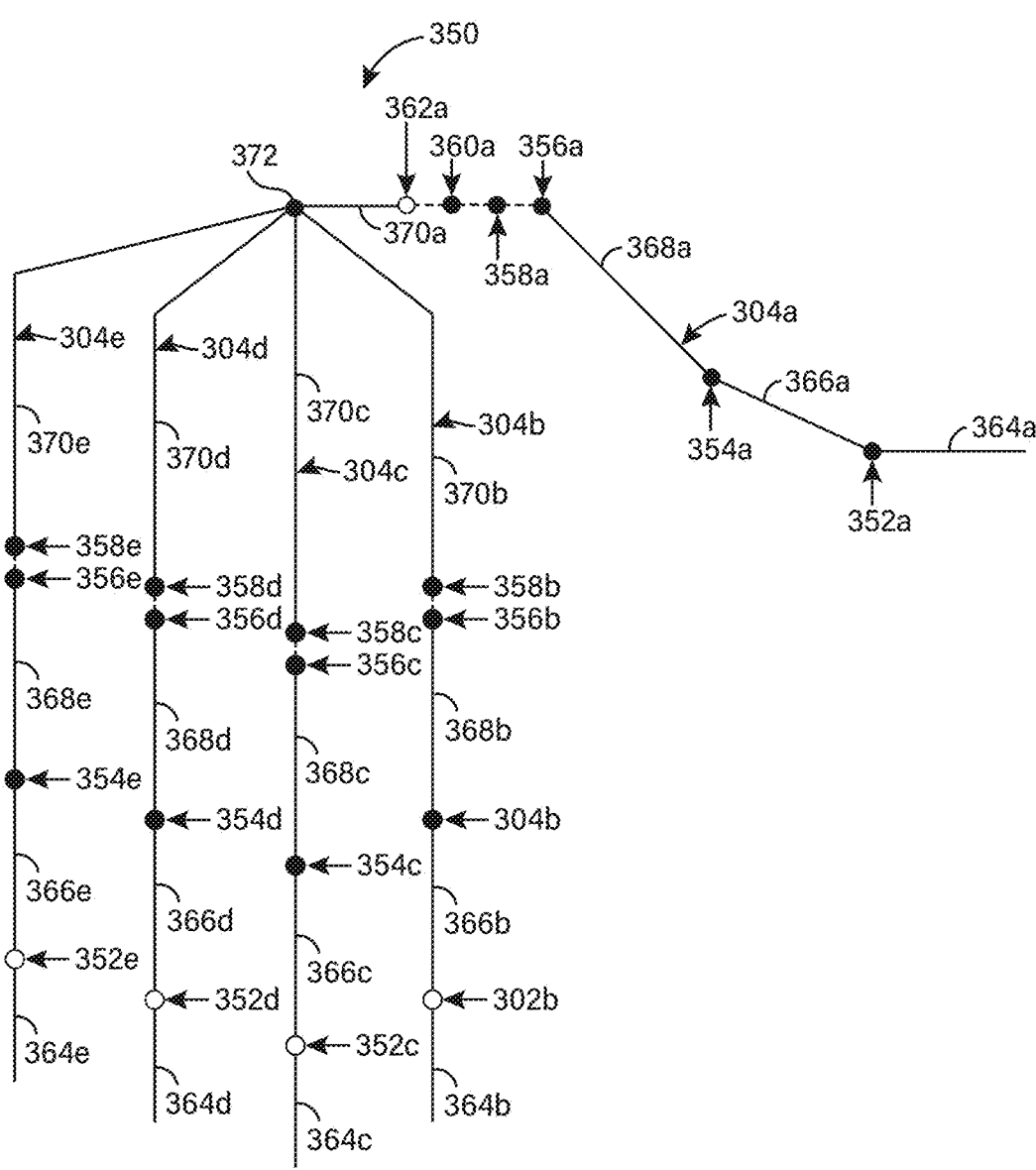
FIG. 3B is a diagram of a kinematic structure of the end effector shown in FIG. 3A.

FIG. 3B illustrates an example kinematic structure 350 for the example end effector 300 shown in FIG. 3A. The kinematic structure 350 illustrates links that are coupled together with joints having one or more DOFs.

The finger 304*a* has a joint with a flexion DOF 352*a*, a joint with a flexion DOF 354*a*, a joint with a flexion DOF 356*a* and abduction DOF 358*a*, joint with two opposition DOFs 360*a*, 362*b*. The DOF 352*a* is formed between a distal link 364*a* and a proximal link 366*a*; the DOF 354*a* is formed between the proximal link 366*a* and a base link 368*a*; and the DOFs 356*a*, 358*a*, 360*a*, 362*a* are formed between the base link 368*a* and a finger base 370*a*, which is connected to a wrist joint 372 (which can be at the wrist interface 303 in FIG. 3A).

The finger 304*b* has a joint with a flexion DOF 352*b*, a joint with a flexion DOF 354*b*, and a joint with a flexion DOF 356*b* and abduction DOF 358*b*. The DOF 352*b* is formed between a distal link 364*b* and a middle link 366*b*; the DOF 354*b* is formed between the middle link 366*b* and a proximal link 368*b*; and the DOFs 356*b*, 358*b* are formed between the proximal link 368*b* and a base link 370*b*, which is connected to the wrist joint 372.

The finger 304*c* has a joint with a flexion DOF 352*c*, a joint with a flexion DOF 354*c*, and a joint with a flexion DOF 356*c* and abduction DOF 358*c*. The DOF 352*c* is formed between a distal link 364*c* and a middle link 366*c*; the DOF 354*c* is formed between the middle link 366*b* and a proximal link 368*c*; and the DOFs 356*c*, 358*c* are formed between the proximal link 368*c* and a base link 370*c*, which is connected to the wrist joint 372.

The finger 304*d* has a joint with a flexion DOF 352*d*, a joint with a flexion DOF 354*d*, and a joint with a flexion DOF 356*d* and abduction DOF 358*d*. The DOF 352*d* is formed between a distal link 364*d* and a middle link 366*d*; the DOF 354*d* is formed between the middle link 366*b* and a proximal link 368*d*; and the DOFs 356*d*, 358*d* are formed between the proximal link 368*d* and a base link 370*d*, which is connected to the wrist joint 372.

The finger 304*e* has a joint with a flexion DOF 352*e*, a joint with a flexion DOF 354*e*, and a joint with a flexion DOF 356*e* and abduction DOF 358*e*. The DOF 352*e* is formed between a distal link 364*e* and a middle link 366*e*; the DOF 354*e* is formed between the middle link 366*e* and a proximal link 368*e*; and the DOFs 356*e*, 358*e* are formed between the proximal link 368*e* and a base link 370*e*, which is connected to the wrist joint 372.

The joints in the fingers 304*a-e* can be the set of joints 102 in FIGS. 1A and 1B having one or more DOFs that can be controlled by the set of actuators 104.

Additional Examples

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A dynamic system controller comprising: a first error detection point configured to determine a first error between a joint state and a joint state target, wherein the joint state describes an actual state of a set of joints in a dynamic body, the set of joints having one or more degrees of freedom that are controlled by a set of actuators; an impedance controller configured for impedance control, wherein the impedance controller generates an impedance torque/force based on the first error; a first neural network that accepts the joint state target as input and outputs an estimated actuation force to move the set of joints to the joint state target; a second error detection point configured to determine a second error between an actual actuation force applied to the set of joints by the set of actuators at the joint state and a reference force defined by a combination of the impedance torque/force and the estimated actuation force; and a force controller configured for force control, wherein the force controller generates a set of actuation commands based on the second error.

Example 2: A dynamic system controller according to Example 1, wherein the impedance controller is a proportional-integral-derivative controller.

Example 3: A dynamic system controller according to Example 1, wherein the force controller is a proportional-integral-derivative controller.

Example 4: A dynamic system controller according to any of Examples 1-3, further comprising a second neural network configured to learn a policy based on the joint state and the actual actuation force.

Example 5: A dynamic system controller according to Example 4, wherein the first neural network comprises first weights, wherein the second neural network comprises second weights, and wherein the first weights are initialized with the second weights.

Example 6: A dynamic system controller according to Example 5, wherein the first and second neural networks are shallow neural networks.

Example 7: A dynamic system controller according to Example 4, wherein the second neural network is trained under a condition in which external contact is not applied to the dynamic body by an environment of the dynamic body.

Example 8: A dynamic system controller according to Example 1, wherein the set of actuators is a set of fluid-powered actuators, and further comprising a feedback force calculation that determines the actual actuation force based on a set of pressure readings from a set of valves that control fluid communication with the set of actuators.

Example 9: A dynamic system controller according to Example 8, wherein the set of actuation commands comprises a set of fluid flow rates for the set of valves.

Example 10: A dynamic system controller according to any of Examples 1-9, further comprising a contact force estimation that determines a contact force on the dynamic body based on the joint state and impedance torque/force.

Example 11: A dynamic system controller according to Example 10, wherein the impedance torque/force is impedance torque, wherein the dynamic body comprises an end effector having at least one finger, wherein the contact force comprises a fingertip force for the at least one finger, and wherein the contact force estimation obtains a Jacobian from the joint state and determines the fingertip force based on a transpose of the Jacobian and the impedance torque.

Example 12: A dynamic system controller according to Example 10, wherein the impedance torque/force is impedance force, wherein the dynamic body comprises an end effector having at least one finger, wherein the contact force comprises a fingertip force for the at least one finger, and wherein the contact force estimation determines the fingertip force based on zero virtual work on the at least one finger.

Example 13: A method of dynamic system control, the method comprising determining a first error between a joint state and a joint state target, wherein the joint state describes an actual state of a set of joints in a dynamic body, the set of joints having one or more degrees of freedom that are controlled by a set of actuators; applying the first error to an input of an impedance controller configured for impedance control to obtain an impedance torque/force based on the first error; applying the joint state target to an input of a first neural network to obtain an estimated actuation force to move the set of joints to the joint state target; determining an actual actuation force applied to the set of joints by the set of actuators at the joint state; determining a second error between the actual actuation force and a combination of the impedance torque and the estimated actuation force; and applying the second error to an input of a force controller configured for force control to obtain a set of actuation commands.

Example 14: A method according to Example 13, further comprising generating controls for the set of actuators based on the set of actuation commands.

Example 15: A method according to Example 13 or 14, further comprising training a second neural network to learn a policy based on the joint state and the actual actuation force.

Example 16: A method according to Example 15, further comprising initializing weights of the first neural network with weights of the second neural network.

Example 17: A method according to any of Examples 13-16, further comprising determining the actual actuation force based on a set of pressure readings from a set of valves that control fluid communication with the set of actuators.

Example 18: A method according to Example 17, wherein the set of actuation commands comprises a set of fluid flow rates for the set of valves.

Example 19: A method according to any of Examples 13-18, further comprising estimating a contact force on the dynamic body based on the joint state and the impedance torque.

Example 20: A method of dynamic system control, the method comprising operating a dynamic system controller in a first mode, the operation in the first mode comprising at least one cycle of: accepting a first joint state describing an actual state of a set of joints in a dynamic body, the set of joints having one or more degrees of freedom that are controlled by a set of actuators; accepting a first joint state target; determining a first error between the joint state and the joint state target; applying the first error to an input of an impedance controller configured for impedance control to obtain a first impedance torque/force based on the first error; determining a second error between the first impedance torque/force and an actual actuation force applied to the set of joints at the first joint state; and applying the second error to an input of a force controller configured for force control to obtain a first set of actuation commands; and during operating the dynamic system controller in the first mode, training a first neural network to learn a mapping between the first joint state and the actual actuation force applied to the set of joints at the first joint state.

Example 21: A method according to Example 19, further comprising transferring weights of the first neural network to a second neural network.

Example 22: A method according to Example 20, further comprising operating the dynamic system controller in a second mode, the operation in the second mode comprising at least one cycle of: accepting a second joint state describing the set of joints; accepting a second joint state target; determining a third error between the second joint state and the second joint state target; applying the third error to the input of the impedance controller to obtain a second impedance torque/force based on the third error; applying the third joint state target to the input of the second neural network to obtain an estimated actuation force to move the set of joints to the second joint state target; determining a fourth error between a combination of the second impedance torque/force and the estimated actuation force and the actual actuation force applied to the set of joints at the second joint state; and applying the fourth error to the input of the force controller to obtain a second set of actuation commands.

Example 23: A method of controlling an end effector, the method comprising: determining a first error between a joint state of the end effector and a joint state target, wherein the joint state describes an actual state of a set of joints in the end effector, the set of joints having one or more degrees of freedom that are controlled by a set of actuators; applying the first error to an input of an impedance controller configured for impedance control to generate an impedance torque/force based on the first error; determining a fingertip force for at least one finger of the end effector based on the joint state and the impedance torque/force; and generating a control for the end effector based at least in part on the fingertip force.

Example 24: A method according to Example 23, wherein generating the control for the end effector based at least in part on the fingertip force comprises transmitting the fingertip force to a machine learning system or a teleoperation system.

Example 25: A method according to any of Examples 23-24, further comprising applying the joint state target to an input of a first neural network to obtain an estimated actuation force to move the set of joints to the joint state target; determining an actual actuation force applied to the set of joints at the joint state; determining a second error between the actual actuation force and a reference force defined by a combination of the impedance torque/force and estimated actuation force; and applying the second error to an input of a force controller configured for force control to generate a set of actuation commands based on the second error.

Example 26: A method according to Example 25, wherein determining the actual actuation force comprises determining the actual actuation force based on a set of pressure readings from a set of valves that control fluid communication with the set of actuators.

Example 27: A method according to Example 26, wherein the set of actuation commands comprise a set of fluid flow rates for the set of valves.

Example 28: A dynamic system controller comprising: a first error detection point configured to determine and output a first error between a joint state and a joint state target, wherein the joint state describes an actual state of a set of joints in a dynamic body, the set of joints having one or more degrees of freedom that are controlled by a set of actuators; an impedance controller having an impedance controller input and an impedance controller output, wherein the impedance controller input is coupled to the first error detection point to receive the first error, wherein the impedance controller is configured to generate and output an impedance torque or force based on the first error; a summing point having a first summing input coupled to the impedance controller output to receive the impedance torque or force, wherein the summing point generates and outputs a reference force based at least in part on the impedance torque or force; a second error detection point configured to determine and output a second error between the reference force and an actual actuation force applied to the set of joints by the set of actuators at the joint state; and a force controller having a force controller input coupled to the second error detection point to receive the second error, wherein the force controller is configured to generate and output a set of actuation commands based on the second error.

Example 29: A dynamic system controller according to Example 28, wherein the impedance controller is a proportional-integral-derivative controller.

Example 30: A dynamic system controller according to Example 28, wherein the force controller is a proportional-integral-derivative controller.

Example 31: A dynamic system controller according to Example 28, further comprising: a feedforward estimation that receives the joint state target, the feedforward estimation comprising a first neural network that outputs an estimated actuation force to move the set of joints to the joint state target.

Example 32: A dynamic system controller according to Example 31, wherein the summing point includes a second summing input coupled to an output of the first neural network to receive the estimated actuation force, and wherein the summing point generates the reference force based on the estimated actuation force and the impedance torque or force.

Example 33: A dynamic system controller according to Example 31, further comprising: a feedforward training that receives the joint state and the actual actuation force, the feedforward training comprising a second neural network that learns a policy based on the joint state and the actual actuation force.

Example 34: A dynamic system controller according to Example 33, wherein the first neural network comprises first weights, wherein the second neural network comprises second weights, and wherein the first weights are initialized with the second weights.

Example 35: A dynamic system controller according to Example 34, wherein the first and second neural networks are shallow neural networks.

Example 36: A dynamic system controller according to Example 34, wherein the second neural network learns the policy under a condition in which external contact force is not applied to the dynamic body by an environment of the dynamic body.

Example 37: A dynamic system controller according to Example 28, wherein the set of actuators is a set of fluid-powered actuators, and further comprising a feedback force calculation that receives a set of pressure readings from a set of valves that control fluid communication with the set of actuators and determines and outputs the actual actuation force based on the set of pressure readings.

Example 38: A dynamic system controller according to Example 37, wherein the set of actuation commands comprises a set of fluid flow rates.

Example 39: A dynamic system controller according to Example 28, further comprising a contact force estimation that receives the joint state and the impedance torque or force and determines and outputs an external contact force on the dynamic body based on the joint state and impedance torque or force.

Example 40: A method of dynamic system control comprising: determining a first error between a joint state and a joint state target, wherein the joint state describes an actual state of a set of joints in a dynamic body, the set of joints having one or more degrees of freedom that are controlled by a set of actuators; applying the first error to an input of an impedance controller to output from the impedance controller an impedance torque or force based on the first error; generating a reference force based at least in part on the impedance torque or force; determining an actual actuation force applied to the set of joints by the set of actuators at the joint state; determining a second error between the reference force and the actual actuation force; and applying the second error to an input of a force controller to output from the force controller a set of actuation commands.

Example 41: A method according to Example 40, further comprising: applying the joint state target to an input of a first neural network to obtain an estimated actuation force to move the set of joints to the joint state target; wherein generating a reference force based at least in part on the impedance torque or force comprises applying the estimated actuation force and the impedance torque or force to a summing point to obtain the reference force.

Example 42: A method according to Example 41, further comprising generating controls for the set of actuators based on the set of actuation commands.

Example 43: A method according to Example 41, further comprising, prior to applying the joint state target to the input of the first neural network to obtain the estimated actuation force, initializing first weights of the first neural network with second weights of a second neural network trained to map joint states to actual actuation forces.

Example 44: A method according to Example 40, wherein determining the actual actuation force comprises receiving a set of pressure readings from a set of valves that control fluid communication with the set of actuators and determining the actual actuation force based on the set of pressure readings, and wherein the set of actuation commands outputted by the force controller comprises a set of fluid flow rates.

Example 45: A method according to Example 44, wherein the set of actuation commands outputted by the force controller comprises a set of fluid flow rates.

Example 46: A method according to Example 40, further comprising estimating a contact force on the dynamic body based on the joint state and the impedance torque or force.

Example 47: A method according to Example 46, wherein the dynamic body is an end effector, and further comprising: generating a control for the end effector based at least in part on the estimated contact force on the dynamic body; and transmitting the control for the end effector to a machine learning system or a teleoperation system.

The invention claimed is:

1. A dynamic system controller comprising:
a first error detection point configured to determine and output a first error between a joint state and a joint state target, wherein the joint state describes an actual state of a set of joints in a dynamic body, the set of joints having one or more degrees of freedom that are controlled by a set of actuators;
an impedance controller having an impedance controller input and an impedance controller output, wherein the impedance controller input is coupled to the first error detection point to receive the first error, wherein the impedance controller is configured to generate and output an impedance torque or force based on the first error;
a summing point having a first summing input coupled to the impedance controller output to receive the impedance torque or force, wherein the summing point generates and outputs a reference force based at least in part on the impedance torque or force;
a second error detection point configured to determine and output a second error between the reference force and an actual actuation force applied to the set of joints by the set of actuators at the joint state; and
a force controller communicatively coupled to an actuator control that translates actuator commands to controls for the set of actuators, the force controller having a force controller input coupled to the second error detection point to receive the second error, wherein the force controller is configured to generate a set of actuation commands based on the second error and output the set of actuator commands to the actuator control.

2. The dynamic system controller of claim 1, wherein the impedance controller is a proportional-integral-derivative controller.

3. The dynamic system controller of claim 1, wherein the force controller is a proportional-integral-derivative controller.

4. The dynamic system controller of claim 1, further comprising:
a feedforward estimation that receives the joint state target, the feedforward estimation comprising a first neural network that outputs an estimated actuation force to move the set of joints to the joint state target.

5. The dynamic system controller of claim 4, wherein the summing point includes a second summing input coupled to an output of the first neural network to receive the estimated actuation force, and wherein the summing point generates the reference force based on the estimated actuation force and the impedance torque or force.

6. The dynamic system controller of claim 4, further comprising:
a feedforward training that receives the joint state and the actual actuation force, the feedforward training comprising a second neural network that learns a policy based on the joint state and the actual actuation force.

7. The dynamic system controller of claim 6, wherein the first neural network comprises first weights, wherein the second neural network comprises second weights, and wherein the first weights are initialized with the second weights.

8. The dynamic system controller of claim 7, wherein the first and second neural networks are shallow neural networks.

9. The dynamic system controller of claim 6, wherein the second neural network learns the policy under a condition in which external contact force is not applied to the dynamic body by an environment of the dynamic body.

10. The dynamic system controller of claim 1, wherein the set of actuators is a set of fluid-powered actuators, wherein the actuator control comprises a set of valves that control fluid communication with the set of actuators, and further comprising a feedback force calculation that receives a set of pressure readings from the set of valves that control fluid communication with the set of actuators and determines and outputs the actual actuation force based on the set of pressure readings.

11. The dynamic system controller of claim 10, wherein the set of actuation commands comprises a set of fluid flow rates.

12. The dynamic system controller of claim 1, further comprising a contact force estimation that receives the joint state and the impedance torque or force and determines and outputs an external contact force on the dynamic body based on the joint state and impedance torque or force.

13. A method of dynamic system control, the method comprising:
determining a first error between a joint state and a joint state target, wherein the joint state describes an actual state of a set of joints in a dynamic body, the set of joints having one or more degrees of freedom that are controlled by a set of actuators;
applying the first error to an input of an impedance controller to output from the impedance controller an impedance torque or force based on the first error;
generating a reference force based at least in part on the impedance torque or force;
determining an actual actuation force applied to the set of joints by the set of actuators at the joint state;
determining a second error between the reference force and the actual actuation force;
applying the second error to an input of a force controller to output from the force controller a set of actuation commands; and
outputting the set of actuator commands to an actuator control, wherein the actuator control translates the set of actuator commands to controls for the set of actuators.

14. The method of claim 13, further comprising:
applying the joint state target to an input of a first neural network to obtain an estimated actuation force to move the set of joints to the joint state target;
wherein generating a reference force based at least in part on the impedance torque or force comprises applying the estimated actuation force and the impedance torque or force to a summing point to obtain the reference force.

15. The method of claim 14, further comprising generating controls for the set of actuators based on the set of actuation commands.

16. The method of claim 14, further comprising, prior to applying the joint state target to the input of the first neural network to obtain the estimated actuation force, initializing first weights of the first neural network with second weights of a second neural network trained to learn a policy from joint states and corresponding actual actuation forces.

17. The method of claim 13, wherein determining the actual actuation force comprises:

receiving a set of pressure readings from a set of valves of the actuator control that controls fluid communication with the set of actuators; and determining the actual actuation force based on the set of pressure readings.

18. The method of claim 17, wherein the set of actuation commands outputted by the force controller comprises a set of fluid flow rates, and wherein the actuator control translates the set of fluid flow rates into a set of valve commands for the set of valves.

19. The method of claim 13, further comprising estimating a contact force on the dynamic body based on the joint state and the impedance torque or force.

20. The method of claim 19, wherein the dynamic body is an end effector, and further comprising:

generating a control for the end effector based at least in part on the estimated contact force on the dynamic body; and transmitting the control for the end effector to a machine learning system or a teleoperation system.

\* \* \* \* \*